Sept. 1, 1931.  R. S. SANFORD  1,821,452
LEVER CONNECTION
Filed Aug. 15, 1927

INVENTOR
ROY S. SANFORD
BY
*J.W. McConkey*
ATTORNEY

Patented Sept. 1, 1931

1,821,452

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

LEVER CONNECTION

Application filed August 15, 1927. Serial No. 213,177.

This invention relates to operating mechanism, as for example a part of the chassis hookup of a set of four-wheel automobile brakes, and is illustrated as embodied in a novel arm adjustably mounted on an operating shaft.

Preferably the arm is formed with spaced sides having openings embracing the shaft, and which openings or the shaft or both may be serrated if desired, and means such as a clamp bolt is provided for pinching the sides toward each other when the arm is in its desired adjusted angular position, thus causing the openings to bind on the shaft to clamp the arm firmly in place.

Figure 1:
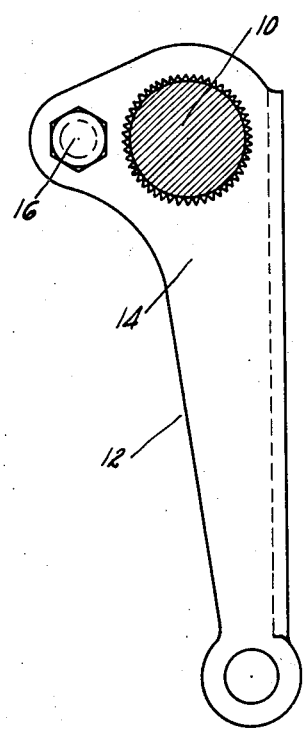
Figure 2:
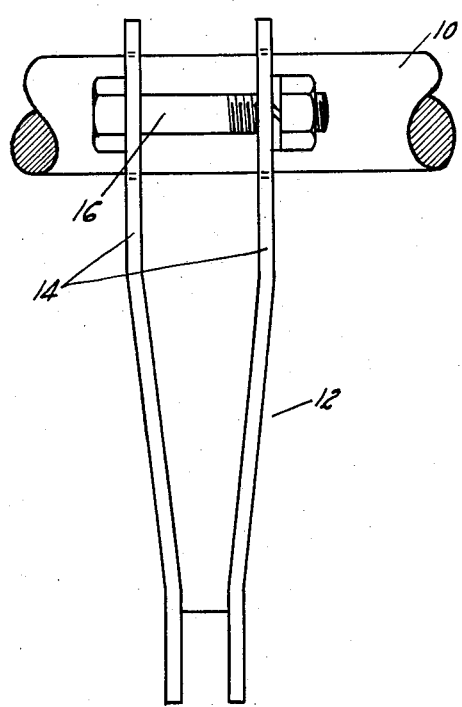

The above and other objects and features of the invention, including various novel and desirable details of construction, will be apparent from the following description of one illustrative embodiment, shown in the accompanying drawings, in which:

Figure 1 is a section through the shaft just inside the arm and showing the arm in side elevation; and Figure 2 is a rear elevation of the parts shown in Figure 1 and looking from the left in Figure 1.

The novel operating mechanism illustrated in the drawings includes an angularly movable shaft 10, which may be one of the shafts of the chassis hookup in a set of four-wheel automobile brakes, and on which is mounted a novel lever 12 arranged to be adjusted angularly on the shaft when desired. Preferably the arm 12 is generally channel-shaped, to provide sides 14 formed with openings for the shaft 10, the openings or the shaft or both being serrated if desired to provide for positive interlocking when the arm is in any desired angular position. The openings in the sides 14 are just enough larger than the shaft 10 to permit the arm to be turned on the shaft. When turned to a desired angular position, the arm is locked in place by pinching the sides 14 toward each other by means such as a clamp bolt 16 passing through suitable projections such as ears 14' in the sides 14 in parallel relation to the shaft 10. This causes the sides 14 to bind tightly on the shaft, thus locking the arm 12 firmly in its adjusted position.

While one illustrative embodiment has been described in detail, it is not my intention to limit the scope of the invention to that particular embodiment or otherwise than by the terms of the appended claims.

I claim:

1. Operating mechanism comprising, in combination with a shaft, a channel section stamping constituting an arm, the same being provided with openings at one end thereof adapted to receive said shaft, said arm having and being secured to said shaft by a bolt and nut assembly extending parallel to said shaft and having ears at the orificed ends of the arm through which the bolt extends, said ears extending at right angles and laterally of said shaft in close proximity thereto.

2. In combination, a shaft, an arm having spaced sides formed with openings embracing the shaft, and means for pinching said sides toward each other to cause the walls of said openings to bind on the shaft, to clamp the arm on the shaft.

3. In combination, a shaft, an arm having spaced sides formed with openings embracing the shaft, and a clamp bolt for pinching said sides toward each other to cause the walls of said openings to bind on the shaft, to clamp the arm on the shaft.

In testimony whereof, I have hereunto signed my name.

ROY S. SANFORD.